US011852767B2

(12) United States Patent
Sun et al.

(10) Patent No.: US 11,852,767 B2
(45) Date of Patent: Dec. 26, 2023

(54) ROBUST FULL WAVEFORM INVERSION OF SEISMIC DATA METHOD AND DEVICE

(71) Applicant: KING ABDULLAH UNIVERSITY OF SCIENCE AND TECHNOLOGY, Thuwal (SA)

(72) Inventors: Bingbing Sun, Thuwal (SA); Tariq Alkhalifah, Thuwal (SA)

(73) Assignee: KING ABDULLAH UNIVERSITY OF SCIENCE AND TECHNOLOGY, Thuwal (SA)

(*) Notice: Subject to any disclaimer, the term of this patent is extended or adjusted under 35 U.S.C. 154(b) by 544 days.

(21) Appl. No.: 16/981,058

(22) PCT Filed: Jan. 25, 2019

(86) PCT No.: PCT/IB2019/050634
§ 371 (c)(1),
(2) Date: Sep. 15, 2020

(87) PCT Pub. No.: WO2019/186286
PCT Pub. Date: Oct. 3, 2019

(65) Prior Publication Data
US 2021/0018639 A1    Jan. 21, 2021

Related U.S. Application Data

(60) Provisional application No. 62/713,246, filed on Aug. 1, 2018, provisional application No. 62/648,569, filed on Mar. 27, 2018.

(51) Int. Cl.
*G01V 1/30* (2006.01)

(52) U.S. Cl.
CPC ........ *G01V 1/303* (2013.01); *G01V 2210/614* (2013.01); *G01V 2210/6161* (2013.01); *G01V 2210/6222* (2013.01)

(58) Field of Classification Search
CPC ............. G01V 1/303; G01V 2210/614; G01V 2210/6161; G01V 2210/6222
See application file for complete search history.

(56) References Cited

U.S. PATENT DOCUMENTS

2014/0321713 A1* 10/2014 Sava ................. G01V 1/303
382/109
2017/0131418 A1* 5/2017 Wang ................ G01V 1/303

FOREIGN PATENT DOCUMENTS

| EP | 3168653 A1 | 5/2017 |
| GB | 2509223 A | 6/2014 |
| WO | 2013009944 A1 | 1/2013 |

OTHER PUBLICATIONS

Gélis et al., "Two-dimensional elastic full waveform inversion using Born and Rytov formulations in the frequency domain", Geophys. J. Int. (2007) 168, 605-633 (Year: 2007).*

(Continued)

*Primary Examiner* — Regis J Betsch
(74) *Attorney, Agent, or Firm* — PATENT PORTFOLIO BUILDERS PLLC

(57) ABSTRACT

A method for calculating a velocity model for a subsurface of the earth. The method includes receiving (200) measured seismic data d; calculating (204) predicted seismic data p; selecting (206) a matching filter w that when applied to one of the measured seismic data d or the predicted seismic data p reproduces the other one of the measured seismic data d or the predicted seismic data p; selecting (208) a misfit function J that calculates (1) a distance between the matching filter w and a Dirac Delta function or (2) a travel time shift associated with the measured seismic data; and calculating (218) a new velocity model using the misfit function J, the measured seismic data d, and the predicted seismic data p. The measured seismic data d includes wavefields generated by a seismic source and the wavefields propagate through (Continued)

the subsurface where they are attenuated and reflected, and the attenuated and reflected wavefields are recorded by plural seismic receivers.

11 Claims, 9 Drawing Sheets

(56) References Cited

OTHER PUBLICATIONS

Jeffrey Karl Beckett, "Seismic imaging using matched filters for operator weighting", Master Thesis, University of Calgary, 2004 ( Year: 2004).*

Debens, H. A., et al., "Full-Bandwidth Adaptive Waveform Inversion at the Reservoir," SEG Technical Program Expanded Abstracts 2017, pp. 1378-138, SEG.

Enquist, B., et al., "Application of the Wasserstein Metric to Seismic Signals," Communications in Mathematical Sciences, Nov. 1, 2013, vol. 12, No. 5, pp. 979-988.

Gélis, C., et al., "Two-Dimensional Elastic Full Waveform Inversion Using Born and Rytov Formulations in the Frequency Domain," Geophysical Journal International, Feb. 1, 2007, vol. 168, No. 2, pp. 605-633.

Huang, G.R., "Full-Waveform Inversion via Source-Receiver Extension," Geophysics, May-Jun. 2017, vol. 82, No. 3, pp. R153-R171.

International Search Report in corresponding/related International Application No. PCT/IB2019/050634, dated Jul. 15, 2019.

Luo, S., et al., "A Deconvolution Based Objective Function for Wave Equation Inversion," SEG Technical Program Expanded Abstracts 2011, pp. 2788-2792.

Métivier, L., "Measuring the Misfit Between Seismograms Using an Optimal Transport Distance: Application to Full Waveform Inversion," Geophysical Journal International, 2016, vol. 205, pp. 345-377.

Qiu, L., et al., "Full Waveform Inversion with an Exponentially Encoded Optimal-Transport Norm," SEG International Exposition and 87th Annual Meeting, 2017, pp. 1286-1290.

Trad, D.O., et al., "Accurate Interpolation with High Resolution Time Variant Radon Transforms," Geophysics, Mar.-Apr. 2002, vol. 67, No. 2, pp. 644-656.

Van Leeuwen, T., et al., "A Correlation-Based Misfit Criterion for Wave Equation Traveltime Tomography," Geophysical Journal International, 2010, vol. 182, pp. 1383-1394.

Van Leeuwen, T., et al., "Velocity Analysis Based on Data Correlation," Geophysical Prospecting, 2008, vol. 56, pp. 791-803.

Virieux, J., et al., "An Overview of Full-Waveform Inversion in Exploration Geophysics," Geophysics, vol. 74, pp. WCC1-WCC26.

Warner, M., et al., "Adaptive Waveform Inversion: Theory," Geophysics, 2016, vol. 81, pp. R429-R445.

Written Opinion of the International Searching Authority in corresponding/related International Application No. PCT/IB2019/050634, dated Jul. 15, 2019.

Yang, Y., et al., "Analysis of Optimal Transport and Related Misfit Functions in Full-Waveform Inversion," Geophysics, 2018, 83, A7-A12.

Yang, Y., et al., "Application of Optimal Transport and the Quadratic Wasserstein Metric to Full-Waveform Inversion," Geophysics, 2018, vol. 83, pp. R43-R62.

\* cited by examiner (a) (b)

ROBUST FULL WAVEFORM INVERSION OF SEISMIC DATA METHOD AND DEVICE

CROSS-REFERENCE TO RELATED APPLICATIONS

This application is a U.S. National Stage Application of International Application No. PCT/IB2019/050634, filed on Jan. 25, 2019, which claims priority to U.S. Provisional Patent Application No. 62/648,569, filed on Mar. 27, 2018, entitled "ROBUST FULL WAVEFORM INVERSION OF SEISMIC DATA METHOD AND DEVICE," and U.S. Provisional Patent Application No. 62/713,246, filed on Aug. 1, 2018, entitled "ROBUST FULL WAVEFORM INVERSION OF SEISMIC DATA METHOD AND DEVICE," the disclosures of which are incorporated herein by reference in their entirety.

BACKGROUND

Technical Field

Embodiments of the subject matter disclosed herein generally relate to methods and devices for processing seismic data, and more specifically, to applying a robust full waveform inversion (FWI) to seismic data acquired for a given subsurface of the Earth.

Discussion of the Background

Seismic data acquisition and processing techniques generate a profile (image) of the geophysical structure (subsurface) under the surface of the Earth. While this profile does not provide an accurate location for oil and gas reservoirs or other resources, it suggests, to those trained in the field, the presence or absence of oil and/or gas. Thus, providing a high-resolution image of the subsurface is an ongoing process for the exploration of natural resources, including, among others, oil and/or gas. The FWI is one approach to calculating an image of the subsurface. However, the traditional FWI approaches are plagued by various problems that are now discussed.

Full waveform inversion (Virieux and Operto, 2009) aims at producing high-resolution subsurface models capable of computing predicted data that fits the observed seismic waveforms. The FWI is a highly-nonlinear inversion process. Because of this, the subsurface model is iteratively updated using a linearized version of it to reduce the mismatch between the predicted and measured (or observed) seismic data. Mathematically, a misfit function is introduced to characterize such mismatch between the predicted and measured seismic data. Selecting a misfit function is an important ingredient of the optimization problem: a well-behaved misfit function would release the requirement for a good initial velocity model or usable low-frequency signal in the seismic data and resolve the so-called "cycle skipping" issue.

Over the past decade, the least square "$l_2$" norm was widely used as a misfit function for its simplicity and potential for high-resolution models. However, this misfit function suffers from severe cycle skipping limitations. The conventional "$l_2$" norm based misfit function is susceptible to local minima if the lowest wavenumber of the initial model is inaccurate or usable low-frequency signals are absent from the observed seismic data. In this respect, note that acquiring low-frequency signals during seismic data acquisition surveys is difficult.

One option to overcome such a "cycle skipping" issue is to extend the search space to allow seismic data comparisons beyond the "point-to-point" subtraction. An extended function is computed by a deconvolution of the observed and predicted seismic data. If the model and the simulation are correct, the extended function would be similar to a Dirac Delta function, and the energy will focus to zero lag (time) of the deconvolution function. An optimization problem can be formulated by measuring this extended function or its attributes' departure from a Dirac Delta function, or measuring the energy not residing at zero lag. As the extended function replaces the local, sample by sample comparison, with a more global comparison by deconvolution, it can resolve the "cycle skipping" issue. However, as the extended function is computed using the whole trace of the observed and predicted seismic data, the extended function is prone to unwanted cross-talk of different events between the observed and predicted seismic data during the computation process.

Currently, new and more advanced misfit functions were proposed, such as: the matching filter based misfit function (Van Leeuwen and Mulder, 2008, 2010; Luo and Sava, 2011; Warner and Guasch, 2016; Huang et al., 2017; Debens et al., 2017), the optimal transport misfit function (Metivier et al., 2016; Yang et al., 2018; Yang and Engquist, 2018), etc. However, these new misfit functions, including the deconvolution process, still face issues. In complex reflectivity regions, there is considerable overlap of the seismic events that may cause cross-talk in the matching filter and hamper its effectiveness. In fact, the extension function given by the deconvolution can be a drawback in this case. As a result, the traditional methods are sometimes limited to diving waves (Huang et al., 2017) and they suffer when there are strong multiples (Debens et al., 2017) present in the observed seismic data.

Current implementations of the optimal transport process in the FWI are limited to a measure of the distance between the predicted data and the observed data (Metivier et al., 2016; Yang et al., 2018; Yang and Engquist, 2018). However, a requirement of the optimal transport theory indicates that the variables to be measured should be a statistical distribution, i.e., the distribution should have only positive values and its integration over time should be equal to 1. As the recorded seismic data includes traces that are oscillatory in nature and they do not fulfill the requirements of a statistical distribution, transforming the seismic data into a distribution (Yang and Engquist, 2018; Qiu et al., 2017) would alter either the amplitude or the phase of its traces, which would make the application of the inversion process unstable and inaccurate.

The current optimization of the matching filter to penalize energy residing away from zero lag relies on the Born approximation in which the adjoint source measures the sensitivity of the objective function to the modeled data directly (Van Leeuwen and Mulder, 2008, 2010; Luo and Sava, 2011; Warner and Guasch, 2016; Huang et al., 2017; Debens et al., 2017). The resulting adjoint source is focused on the amplitude of the energy away from zero lag, rather then its distance (time). As a result, such methods have an inherent limitation in dealing with broadband data (having a white spectrum), and suffer from slow convergence.

Accordingly, there is a need to provide a FWI process that overcomes the aforementioned deficiencies in data complexity and potential crosstalk, in requirements, and in update procedures.

SUMMARY

According to an embodiment, there is a method for calculating a velocity model for a subsurface of the earth.

The method includes receiving measured seismic data d, calculating predicted seismic data p, selecting a matching filter w that when applied to one of the measured seismic data d or the predicted seismic data p reproduces the other one of the measured seismic data d or the predicted seismic data p, selecting a misfit function J that calculates (1) a distance between the matching filter w and a Dirac Delta function or (2) a travel time shift associated with the measured seismic data, and calculating a new velocity model using the misfit function J, the measured seismic data d, and the predicted seismic data p. The measured seismic data d includes wavefields generated by a seismic source and the wavefields propagate through the subsurface where they are attenuated and reflected, and the attenuated and reflected wavefields are recorded by plural seismic receivers.

According to another embodiment, there is a method for calculating a velocity model for a subsurface of the earth. The method includes receiving measured seismic data d, calculating predicted seismic data p, transforming the measured seismic data d and the predicted seismic data p from a time-space domain to a tau-p domain, selecting a matching filter w in the tau-p domain, wherein the matching filter is applied in the tau-p domain to the measured seismic data d to reproduce the predicted seismic data p, selecting a misfit function J in the tau-p domain, wherein the misfit function J uses (i) a distance between (1) the matching filter w and (2) a Dirac Delta function or another function representation of focusing at zero lag or (ii) a travel time shift associated with the measured seismic data, and calculating a new velocity model using the misfit function J, the measured seismic data d, and the predicted seismic data p. The measured seismic data d includes wavefields generated by a seismic source and the wavefields propagate through the subsurface where they are attenuated and reflected, and the attenuated and reflected wavefields are recorded by plural seismic receivers.

According to still another embodiment, there is a computing unit for calculating a velocity model for a subsurface of the earth. The computing unit includes an interface for receiving measured seismic data d, and a processor connected to the interface. The processor is configured to calculate predicted seismic data p, select a matching filter w that when applied to the measured seismic data reproduces the predicted seismic data p, select a misfit function J that calculates (1) a distance between the matching filter w and a Dirac Delta function or (2) a travel time shift associated with the measured seismic data, and calculate a new velocity model using the misfit function J, the measured seismic data d, and the predicted seismic data p. The measured seismic data d includes wavefields generated by a seismic source and the wavefields propagate through the subsurface where they are attenuated and reflected, and the attenuated and reflected wavefields are recorded by plural seismic receivers.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

Figure 1:
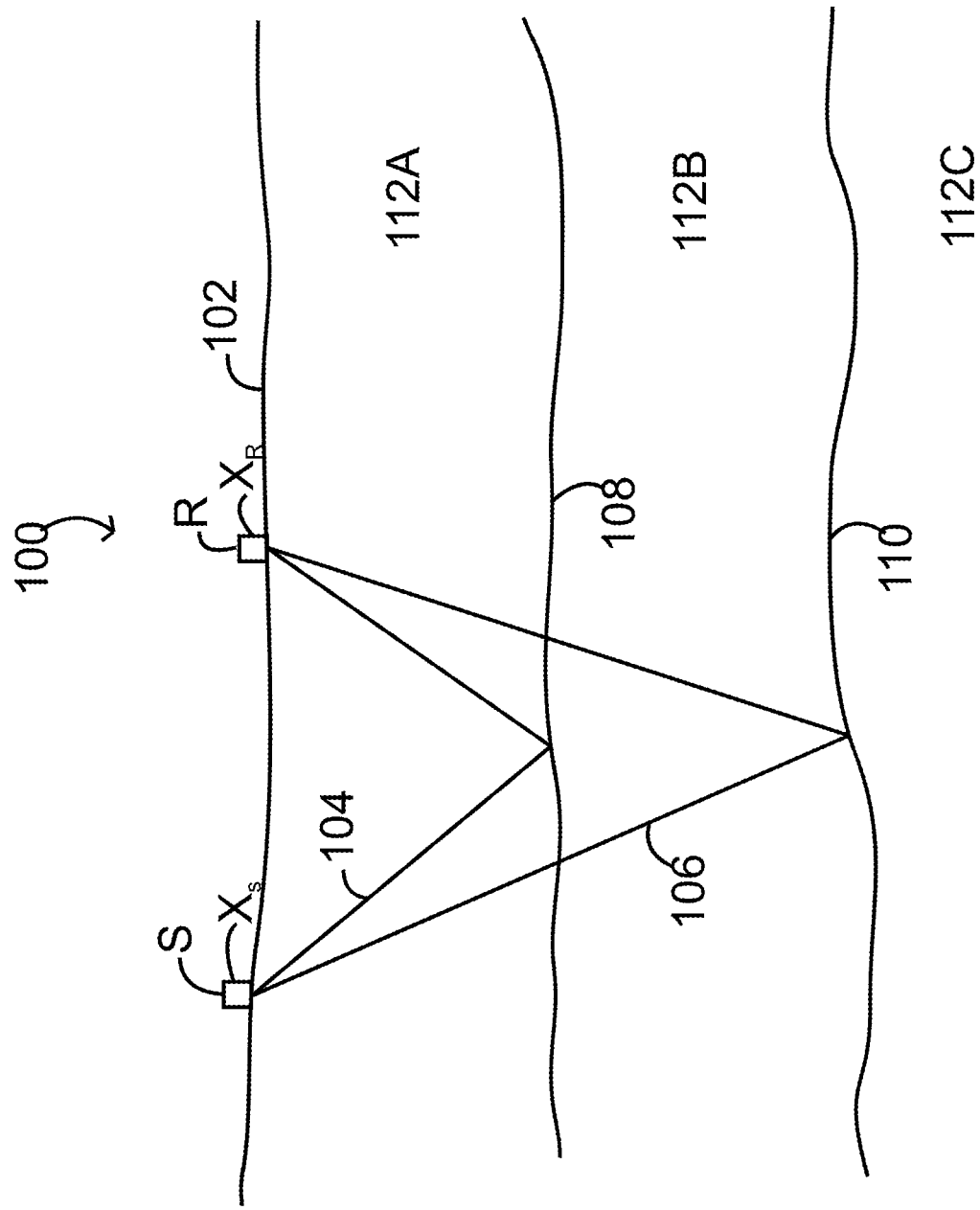
FIG. 1 illustrates a source that generates seismic waves which after getting reflected by the subsurface, are reflected by one or more receivers.

The following description of the embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to applying the FWI process to measured seismic data. However, the invention is not limited to seismic data, but it may be applied to any type of data.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

According to an embodiment, a Radon transform is introduced for transforming the recorded seismic data from the time-space domain to a Radon domain to mitigate cross-talk issues. The Radon transform may be added, for example, into the flow of the matching filter based FWI process. In this embodiment, instead of designing an extended function (matching filter) for each trace directly, at first, the recorded seismic data is transformed, for example, transform the shot gathers into the τ-p domain (where tau is the intercept time and p is the slope) using the Radon transform and then compute, in the Radon domain, the extended function for each trace, indexed by the same p value by deconvolution. The benefits of the Radon transform are used to separate different events and thus, reduce the cross-talk in the following deconvolution stage. Instead of designing the extended function by looking at a single trace, the process in this embodiment also looks at the traces nearby and shift them to the tau-p domain by taking the coherence of the event into consideration. The criterion for a successful inversion is still unchanged, i.e., the extended function should also be a Delta function in the tau-p domain when the velocity is correct.

In order to resolve the issues of the traditional FWI process, instead of measuring directly the distance between the predicted and measured seismic data, according to an embodiment, the method would at first compute a matching filter based on the predicted data and measured seismic data and then measure the distance between the resulting matching filter and the Dirac Delta function. In one embodiment, a precondition would be used to transform the resulting matching filter to be a statistical distribution and, because this embodiment does not directly modify the predicted or observed seismic data, the phase and amplitude of the seismic signal are preserved and the following inversion process should be stable and accurate.

In another embodiment, a Rytov approximation is introduced into the matching filter based optimization process. Thus, according to this embodiment, the method computes an adjoint source using the Rytov approximation. Using the Rytov approximation, it is possible to mitigate an inherent limitation of the traditional Born approximation that is currently used for a band-limited seismic dataset. Note that applying the Rytov approximation may take place in the tau-p domain but also in the time-space domain. For example, it is possible to calculate the matching filter and the misfit function exclusively in the time-space domain and also to apply the Rytov approximation to the matching filter in the time-space domain.

According to an embodiment, a new FWI process is introduced and this process includes at least one of the following new features: (1) using a Rytov approximation to develop an adjoint source and applying the full waveform inversion in the time-space domain for calculating a new velocity model, (2) applying a Radon transform to the seismic data for the application of the full waveform inversion in the Radon domain, and (3) selecting a new misfit function for measuring a distance between the resulting matching filter and the Dirac Delta function. Note that the third feature (3) can be applied together with the first or second features. Before discussing in more detail these features, a brief review of the matching filter based FWI process is believed to be in order.

In the FWI process, a forward modeling, which is described by a wave equation operator L, is used to generate the predicted seismic data $p(t; x_r; x_s)$. Note that the predicted seismic data may be generated from log data, data from a previous seismic survey, or based on the guess of one experienced in this field. The wave equation operator L is applied to the measured seismic data to obtain a source function $f(x,t)$, as follows:

$$L(m)u_S(t,x,x_S)=f(x,t) \tag{1},$$

where x and $x_s$ are the space coordinates and source position respectively, L(v) denotes the wave equation operator, m describes the model parameters, f(x; t) is the source function, and $u_S$ is the source wavefield. The predicted data $p(t; x_r; x_s)$ may then be sampled from the source wavefield by a sampling matrix W, i.e., $p(t; x_r; x_s)=Wu_S$. A misfit function J is then selected, e.g., the least square "$l_2$" norm misfit function which is used to fit the observed data $d(t; x_r; x_s)$. One example of the misfit function J is as follows:

$$J = \sum_{x_r}\sum_{x_s}\sum_{t}[p(t, x_r, x_s) - d(t, x_r, x_s)]^2, \tag{2}$$

where $x_r$ are the coordinates for the seismic receiver position and $x_s$ are the coordinates for the source position as illustrated in FIG. 1. Note that FIG. 1 shows a land seismic survey system 100 having one source S at the surface 102 of the earth and plural receivers R also located at the surface of the earth. The measured seismic data d includes wavefields generated by the seismic source S and the wavefields that propagate through the subsurface, where they are attenuated and reflected, and the attenuated and reflected wavefields are recorded by the seismic receivers R. However, the method discussed herein also works for plural sources S distributed over the surface of the earth, or for plural sources being buried under the ground, or plural receivers being buried under the surface of the earth, or the sources being towed by a vessel in water while the receivers are towed on a streamer behind the same vessel or different vessels or the receivers are ocean bottom cables distributed on the ocean's bottom. FIG. 1 also shows that seismic waves 104 and 106 (e.g., sound waves or electromagnetic waves) emitted by the source S are reflected at various interfaces 108 and 110, respectively, in the subsurface. The interfaces 108 and 110 are boundaries between various layers 112A to 112C of the earth.

The traditional least square "$l_2$" norm misfit function measures the mismatch between two seismic traces by their "sample by sample" difference. However, as already discussed above, this misfit function is highly prone to cycle skipping. In practice, the application of the "$l_2$" norm misfit function would either need kinematically accurate initial models or very low-frequency seismic data to guarantee global convergence to the desired accurate model.

A matching filter based FWI process uses an extended function (or matching filter) $w(t; x_r; x_s)$ for each trace so that the following equation is satisfied:

$$w(t,x_r,x_s)*d(t,x_r,x_s)=p(t,x_r,x_s), \tag{3}$$

where * denotes the convolution operation. The matching filter w can be 2D or 3D over time and space, if needed. Equation (3) is a linear equation and the computation of the matching filter w is a well-resolved problem in signal processing. The matching filter can be computed, for example, either in the time domain or in the frequency domain, as follows:

$$w(t, x_r, x_s) = \mathcal{F}^{-}\left[\frac{\mathcal{F}[p(t, x_r, x_s)]\overline{\mathcal{F}[d(t, x_r, x_s)]}}{\mathcal{F}[d(t, x_r, x_s)]\overline{\mathcal{F}[d(t, x_r, x_s)]} + \epsilon}\right], \tag{4}$$

where $\mathcal{F}$ and $\mathcal{F}^{-}$ denote a Fourier transform between time and frequency and an inverse Fourier transform, respectively, the overline denotes the complex conjugation operator, and $\epsilon$ is a small positive number to avoid division with zero.

When the velocity model (the model that describes the velocity of sound waves 104 and 106 in each layer 112 of earth in FIG. 1) is correct, the matching filter w is reduced to a Dirac Delta function $\delta$, or more generally, the energy focuses near zero lag. Thus, in this embodiment, it is possible to define an optimization problem by applying a penalty function to the matching filter w, to penalize the energy at non-zero time lag, to measure a discrepancy between the observed seismic data d and the predicted seismic data p, for an incorrect velocity model as follows:

$$J = \frac{1}{2}\sum_{x_r}\sum_{x_s}\sum_{t}[P(t)w(t, x_r, x_s)]^2, \tag{5}$$

where P(t) is the penalty function. The time lag noted above appears when one considers the measured data d and the predicted data p. These two sets of data, when used in equation (2) with the matching filter w, may have their time "t" not matching to each other, i.e., the time of one set of data lagging the time of the other set of data. Thus, the term "zero time lag" means that there is a perfect time match between the times of the two sets of data, i.e., the matching filter is a delta function, which when applied to the measured seismic data d results in the predicted seismic data p.

However, if there is time mismatch between these two sets of data, then a non-zero time lag is present.

In one embodiment, the penalty function P(t) may be a linear function. For example, the penalty function may be P(t)=|t|. Other values for the penalty function may be used. Note that in this embodiment the penalty function penalizes the matching filter w at non-zero time lag while in the art, the penalty function penalizes the data itself, i.e., the measured and predicted seismic data. This different approach of penalizing the matching filter and not the seismic data is believed to be novel.

Another novel feature of the FWI process is the use of the Rytov approximation. Using this approximation, the matching filter may be expressed as a sum of shifted weighted Dirac Delta functions, as follow:

$$w(t, x_r, x_s) = \sum_i w_i(t, x_r, x_s) = \sum_i a_i(x_r, x_s)\delta[t - \tau_i(x_r, x_s)], \quad (6)$$

where $w_i$ are the matching filter coefficients, $a_i$ is an amplitude that does not vary with the time, but only with the positions $x_r$ and $x_s$ of the receivers and sources, $\delta$ is the Dirac Delta function, and $\tau_i$ is the time sampling as a function of source and receiver location, and thus, it depends only on the positions $x_r$ and $x_s$, and it could be the tau coordinate (intercept time) in the tau-p domain as a function of a space coordinate (like source or receiver) and slope p.

In this definition, the matching filter coefficients $w_i$ are determined by 2 parameters ($a_i$; $\tau_i$), and thus, the filter coefficients $w_i$ can change in two ways, either because of the amplitude $a_i$ or because of the tau component $\tau_i$, which means shifting the time lag. Changing the amplitude $a_i$ corresponds to the conventional Born approximation, which is currently used by the existing implementations. Changing the tau component $\tau_i$ corresponds to the Rytov approximation and this feature is new to the matching filter implementation. Thus, according to this embodiment, the tau component $\tau_i$ is varied to implement the Rytov approximation.

For the FWI process, as discussed above, there is a mismatch between the measured seismic data d and the predicted seismic data p. This mismatch can be accounted for in the FWI process by using the notion of an "adjoint source" s, i.e., a source that is responsible for a measure of the mismatch. This adjoint source is not a physical source. It is rather a mathematical construct that is responsible for the difference between the measured data and the predicted data and it can be used with wavefields. In this embodiment, the adjoint source is back-propagated to update the model.

Using the Rytov approximation, the adjoint source s is described in one embodiment by:

$$\delta s(t, x_r, x_s) = \sum_i \frac{\partial \tau_i}{\partial p} \frac{\partial J}{\partial \tau_i}, \quad (7)$$

where p is the predicted seismic data, J is the misfit function, and $\tau_i$ is the tau coordinate. If equation (6) is substituted into equation (5), and the penalty function is considered to be P(t)=|t|, then the misfit function J becomes:

$$J = \frac{1}{2}\sum_{x_r}\sum_{x_s}\sum_t a_i^2(x_r, x_s)\tau_i^2(x_r, x_s). \quad (8)$$

The adjoint source can be rewritten, based on equation (8), as:

$$\delta s(t, x_r, x_s) = \sum_i \frac{\partial \tau_i(x_r, x_s)}{\partial p}\tau_i(x_r, x_s)a_i^2(x_r, x_s), \quad (9)$$

Using the Rytov approximation of the matching filter (see equation (6)) in equation (3), the convolution of the matching filter with the measured seismic data d becomes:

$$d(t, x_r, x_s) * \sum_i a_i(x_r, x_s)\delta[t - \tau_i(x_r, x_s)] = p(t, x_r, x_s). \quad (10)$$

Using the rule of derivative for implicit functions, for a connection function F(u, v)=0, the derivative of u with v can be written as:

$$\frac{du}{dv} = -\frac{\frac{\partial F(u, v)}{\partial v}}{\frac{\partial F(u, v)}{\partial u}}. \quad (11)$$

Applying the rule of derivative shown in equation (11) while considering equation (10) to be the connection function, results in:

$$\frac{\partial \tau_i(x_r, x_s)}{\partial p} = -\frac{1}{d'(t - \tau_i, x_r, x_s)} = -\frac{d'(t - \tau_i, x_r, x_s)}{\|d(t - \tau_i, x_r, x_s)\|_2^2}. \quad (12)$$

Substituting equation (12) into equation (9) results in the following expression for the adjoint source:

$$\delta s(t, x_r, x_s) = -\sum_i \frac{d'(t - \tau_i, x_r, x_s)}{\|d(t - \tau_i, x_r, x_s)\|_2^2}\tau_i(x_r, x_s)a_i^2(x_r, x_s). \quad (13)$$

Having the adjoint source given by equation (13), the adjoint state wavefield $u_R$ can be computed as follows:

$$L^*(m)u_R(t, x, x_S) = \sum_{x_r} \delta s(t, x_r, x_s), \quad (14)$$

where x=(x, y, z) is the vectorial coordinate of the subsurface and L* is the adjoint wave equation operator. Note that L may represent any wave equation operator that is applicable to a wave. For example, in one application, the operator L may be given as follows:

$$\frac{\partial^2 u_s(t, x, x_S)}{\partial t^2} = \Delta u_s(t, x, x_S) + \delta(x - x_s)f(t), \text{ and} \quad (15)$$

$$\frac{\partial^2 u_R(t, x, x_S)}{\partial t^2} = \Delta u_R(t, x, x_S) + \sum_{x_r} \delta s(t, x_r, x_s), \quad (16)$$

where $\Delta$ is the Laplace operator. Equations (1) and (15) would be solved forward in time, from t=0 to t=$T_{max}$ while equations (14) and (16) would be solved backward in time (reverse time) from t=$T_{max}$ to t=0.

The gradient g with respect to the model parameter m may be calculated as:

$$g = \sum_t \sum_{x_S} \frac{\partial L(m)}{\partial n} u_s(t, x, x_S) u_R(t, x, x_S). \quad (17)$$

Then, in one embodiment to find a maximum or minimum of the model for parameter m, a linear search using equation (1) is performed for finding a step γ that guarantees a sufficient decrease of the misfit function J, so that:

$$J(m-\gamma g) < J(m), \quad (18)$$

so that the new model parameter m is given by:

$$m_{new} = m - \gamma g. \quad (19)$$

The above equations are iteratively computed until a pre-determined stopping criteria is met, e.g., repeat the calculations up to a maximum number of iterations or the misfit function value J(m−γg) drops to a certain value. In one embodiment, the model is the velocity model.

Figure 2A:
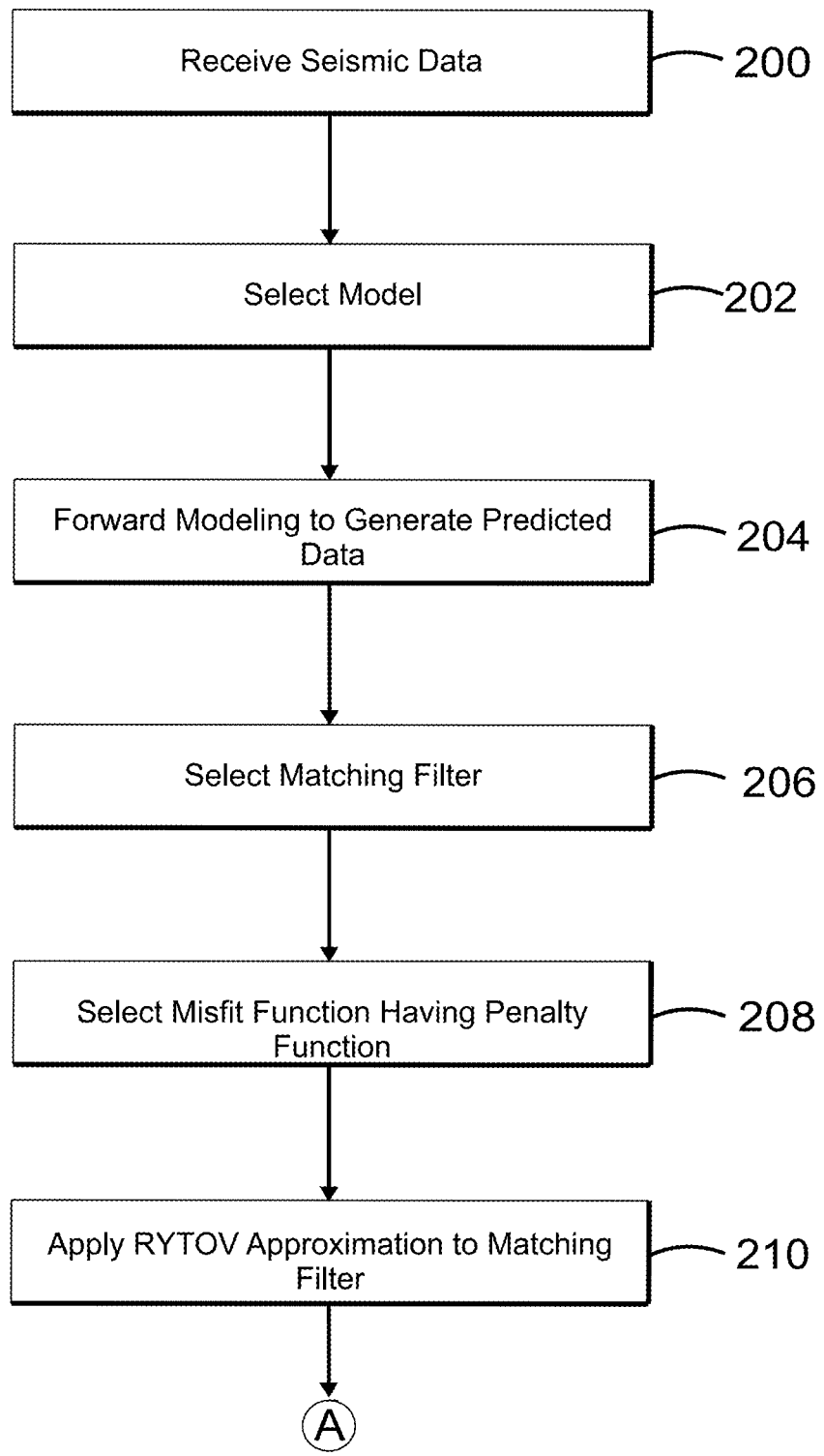
FIGS. 2A and 2B illustrate a flowchart of a method for calculating a new velocity model using a misfit function that penalizes a matching filter.

The FWI process discussed above is now illustrated with regard to FIGS. 2A and 2B. FIG. 2A is a flowchart that illustrates a method for calculating a velocity model for a given set of seismic data d. According to this method, in step 200, a set of measured seismic data d is received. The set can be land data, marine data, log data, etc. In step 202, a starting velocity model v is selected. This initial or starting model may be derived from other seismic data, log data, or may be a guess. Using the starting velocity model v, the predicted data p is calculated in step 204 using a wave equation operator L and the starting velocity model v (see also equation (1)). A matching filter w is selected in step 206 (see equation (3)) and a misfit function J is selected in step 208 (see equation (5)). The misfit function J is based on the matching filter w and on a penalty function P. As previously discussed, the penalty function penalizes the matching filter when the matching filter deviates from a Delta Dirac function. In step 210, a Rytov approximation (see equation (6)) is applied to the matching filter w. In step 212, the adjoint source is expressed based on the misfit function (see equations (7) and (13)), in step 214 the adjoint state wavefield $u_R$ is calculated, for example, based on equation (14), and in step 216 a gradient of the wave field velocity operator L with regard to the model parameter m is calculated, for example, based on equation (15). Based on the calculated gradient g, a global minimum or maximum of the misfit function J is calculated, which produces in step 218 the new velocity model $v_{new}$. This process may be repeated a few times, if necessary, until a predetermined condition is met, for example, misfit function values is below a given threshold, or the calculations are repeated a predetermined number of times. In step 220, based on the new velocity model, an image of the subsurface may be calculated.

Figure 3:
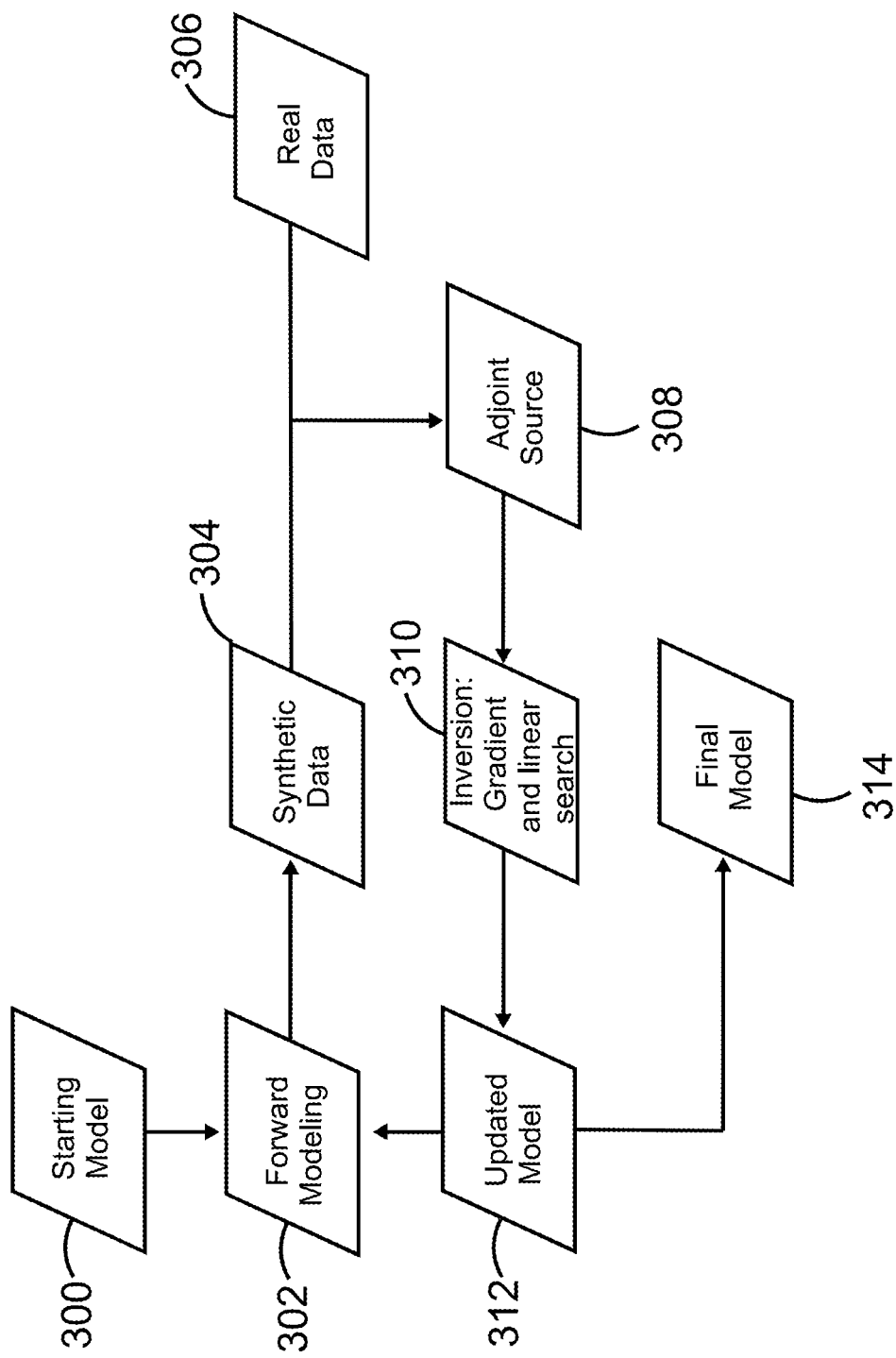
FIG. 3 is a flowchart of a method for updating a model using a full waveform inversion.

FIG. 3 also illustrates the FWI process using the penalty function P(t) and the Rytov approximation. The initial velocity model v is received in step 300. Based on this model and equation (8), calculations are performed in step 302 for generating the predicted (or synthetic) seismic data 304. The measured seismic data 306 is used together with the predicted seismic data 304, for calculating in step 308 the adjoint source s. Equations (4), (6), and (7) may be used in step 308 for calculating the adjoint source. In step 310, the inversion is applied to the adjoint source to calculate the gradient g (using equation (15)) and then a linear search is performed (using equations (13) and (16)) for updating the velocity model to a new velocity model $v_{new}$. Step 310 may involve the use of equations (8)-(11). If the updated model $v_{new}$ converges in step 312, i.e., the misfit function has reached a minimum or maximum, this model is considered in step 314 as being the final model. If this is not the case, the process returns to step 302 for repeating the steps noted above.

According to another embodiment, the matching filter discussed above may be used together with a Radon transform in the tau-p domain as now discussed. The matching filter w computed using equations (3) and (4) works with an entire trace from the measured and predicted seismic data as input, and would suffer from the cross-talk between different events. In this embodiment, a Radon transform is used to separate the events based on their space-time coherence, i.e., the slope information, before applying the matching filter. This approach leads to a more robust computation of the matching filter and as a result, to a cleaner and noise-free gradient g, which would be beneficial for a more stable and accurate velocity updating algorithm.

Figure 4A:
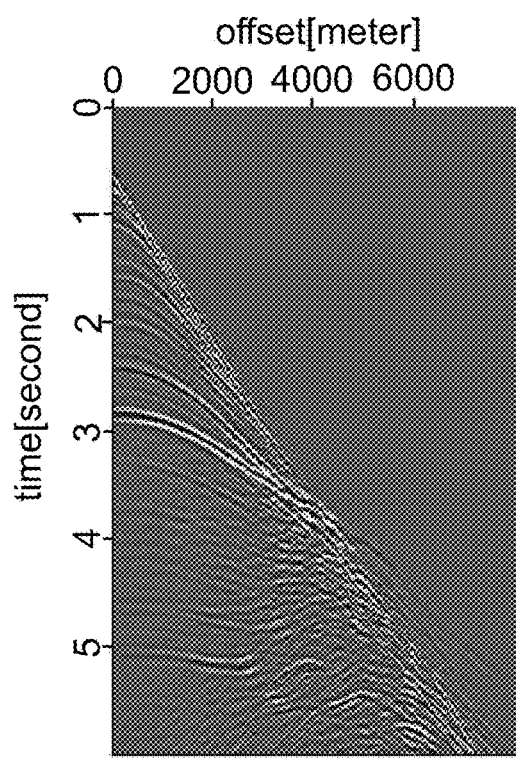
FIG. 4A illustrates a common shot gather in the time-space domain and FIG. 4B illustrates the same gather transformed into the tau-p domain.
Figure 4B:
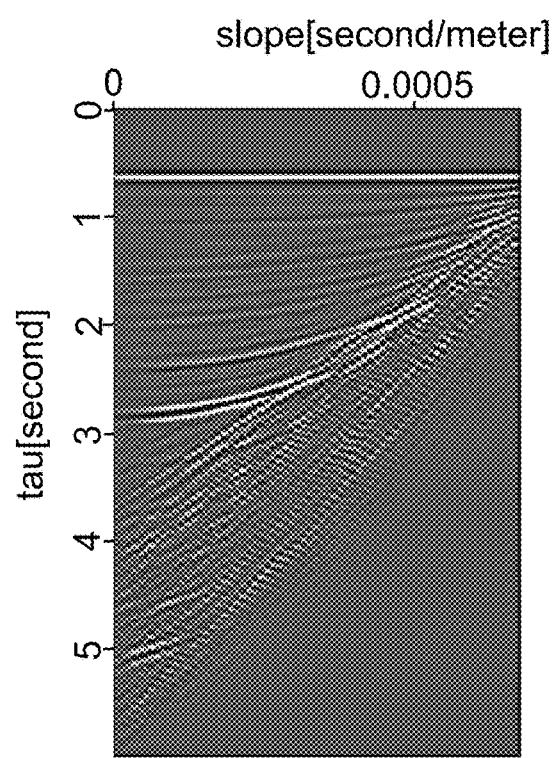

For a common shot gather q(t, $x_r$, $x_S$), the Radon transform $\mathcal{R}$, which is a linear operator, maps the seismic data (the gather in this case) from the time-space domain (t-x) to the Radon domain (tau-p) as follows:

$$\tilde{q}(\tau, x_r, x_S) = \mathcal{R}[q(t, x_r, x_S)] = \sum_h q(\tau + p, x_r, x_S), \quad (20)$$

where p is the slope in the tau-p domain, the tilde above the q indicates the Radon domain, and h is a local spatial coordinate (for a 2D problem, these vectors would have one component and for a 3D problem they will have two components). The Radon transform $\mathcal{R}$ is applied locally in this embodiment and a constraint may be applied for each component $|h_i| < h_{max}$, where $h_{max}$ is a given threshold. FIG. 4A illustrates a seismic common shot gather q(t, $x_r$,$x_S$) in the time-space domain (note that the Y axis indicates a distance between the receiver and the source and the X axis indicates a depth, measured in time, for each measured ray) and FIG. 4B illustrates the same gather but in the Radon domain $\tilde{q}(\tau, x_r, x_S)$.

The adjoint operator of the Radon transform is $\mathcal{R}^T$, which transforms the data from the tau-p domain back to the t-x domain, and this operator can be written as:

$$q(t, x_r, x_S) = \mathcal{R}^T[\tilde{q}(\tau, p, x_r, x_S)] = \sum_p \tilde{q}(t - p(x_r + h), x_r, x_S). \quad (21)$$

For a tau-p domain implementation of the matching filter, both the observed and the predicted seismic data have to be first transformed into the tau-p domain using equation (20), $$\tilde{p}(\tau, p, x_r, x_S) = \sum_h p(\tau + p \cdot (x_r + h), x_r, x_S), \quad (22)$$

$$\tilde{d}(\tau, p, x_r, x_S) = \sum_h d(\tau + p \cdot (x_r + h), x_r, x_S). \quad (23)$$

Then, the matching filter $\tilde{w}(\tau, p, x_r, x_s)$ is directly defined in the tau-p domain, for example, as:

$$\tilde{w}(\tau,p,x_r,x_s) * \tilde{d}(\tau,p,x_r,x_s) = \tilde{p}(t,p,x_r,x_s), \quad (24)$$

and it can be calculated in the frequency domain as:

$$\tilde{w}(\tau, p, x_r, x_s) = \mathcal{F}^{-}\left[\frac{\mathcal{F}[\tilde{p}(\tau, p, x_r, x_s)]\overline{\mathcal{F}[\tilde{d}(\tau, p, x_r, x_s)]}}{\mathcal{F}[\tilde{d}(\tau, p, x_r, x_s)]\overline{\mathcal{F}[\tilde{d}(\tau, p, x_r, x_s)]} + \epsilon}\right]. \quad (25)$$

In one application, the misfit function in the tau-p domain is then written as a function of the matching filter in the tau-p domain as:

$$J = \frac{1}{2}\sum_{x_r}\sum_{x_s}\sum_t\sum_\tau [P(\tau)\tilde{w}(\tau, p, x_r, x_s)]^2, \quad (26)$$

where the penalty function $P(\tau)$ has the same configuration as the penalty function $P(t)$ in equation (5). The matching filter $\tilde{w}(\tau, p, x_r, x_s)$ in the tau-p domain may be written as a sum of shifted weighted Dirac Delta functions $\delta$, $$\tilde{w}(\tau, p, x_r, x_s) = \sum_i \tilde{w}_i(\tau, p, x_r, x_s) = \sum_i a_i(p, x_r, x_s)\delta[t - \tau_i(p, x_r, x_s)]. \quad (27)$$

If the penalty function is selected to be $P(\tau)=|\tau|$, then the misfit function J can be written as:

$$J = \frac{1}{2}\sum_{x_r}\sum_{x_s}\sum_i\sum_p a_i^2(p, x_r, x_s)\tau_i^2(p, x_r, x_s). \quad (28)$$

Then, the adjoint source can be written as:

$$\delta s(t, x_r, x_s) = \frac{\partial J}{\partial \tau} = \frac{\partial \tilde{p}}{\partial p}\left[\frac{\partial J}{\partial \tilde{p}}\right] \quad (29)$$

$$= \mathcal{R}^T\left[\sum_i \frac{\partial \tau_i(p, x_r, x_s)}{\partial \tilde{p}}\tau_i(p, x_r, x_s)a_i^2(p, x_r, x_s)\right],$$

where $\mathcal{R}^T$ is the adjoint Radon transform defined by equation (21). The term $$\frac{\partial \tau_i(p, x_r, x_s)}{\partial \tilde{p}}$$

can be evaluated similar to the corresponding term in equation (11), which leads to:

$$\frac{\partial \tau_i(p, x_r, x_s)}{\partial \tilde{p}} = -\frac{1}{d'(t - \tau_i, p, x_r, x_s)} = -\frac{d'(t - \tau_i, p, x_r, x_s)}{\|d(t - \tau_i, p, x_r, x_s)\|_2^2}. \quad (30)$$

Figure 2B:
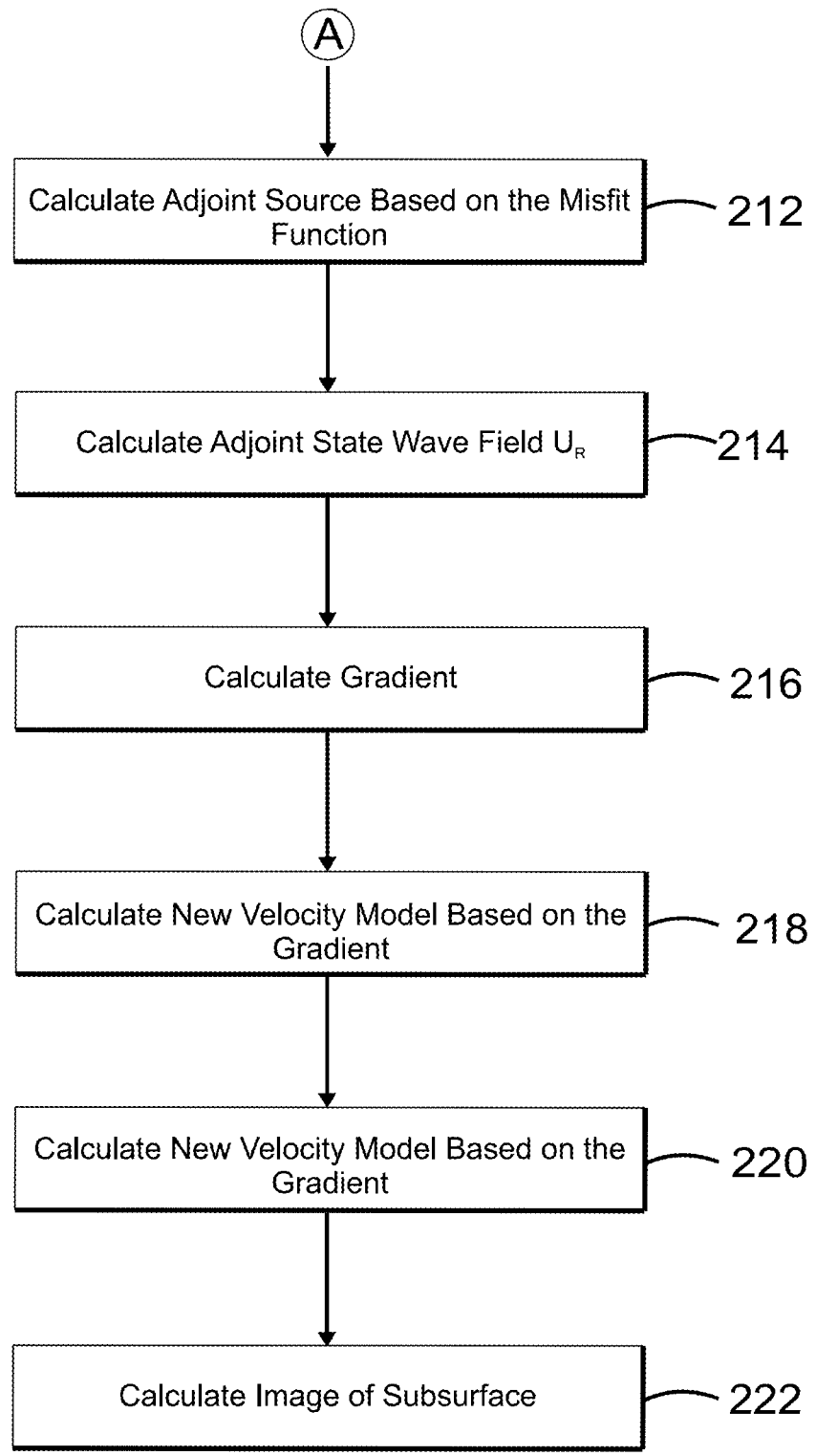

Having the adjoint source given by equation (29), the steps for calculating the new velocity model are similar to those described in the method of FIGS. 2A and 2B.

Figure 5A:
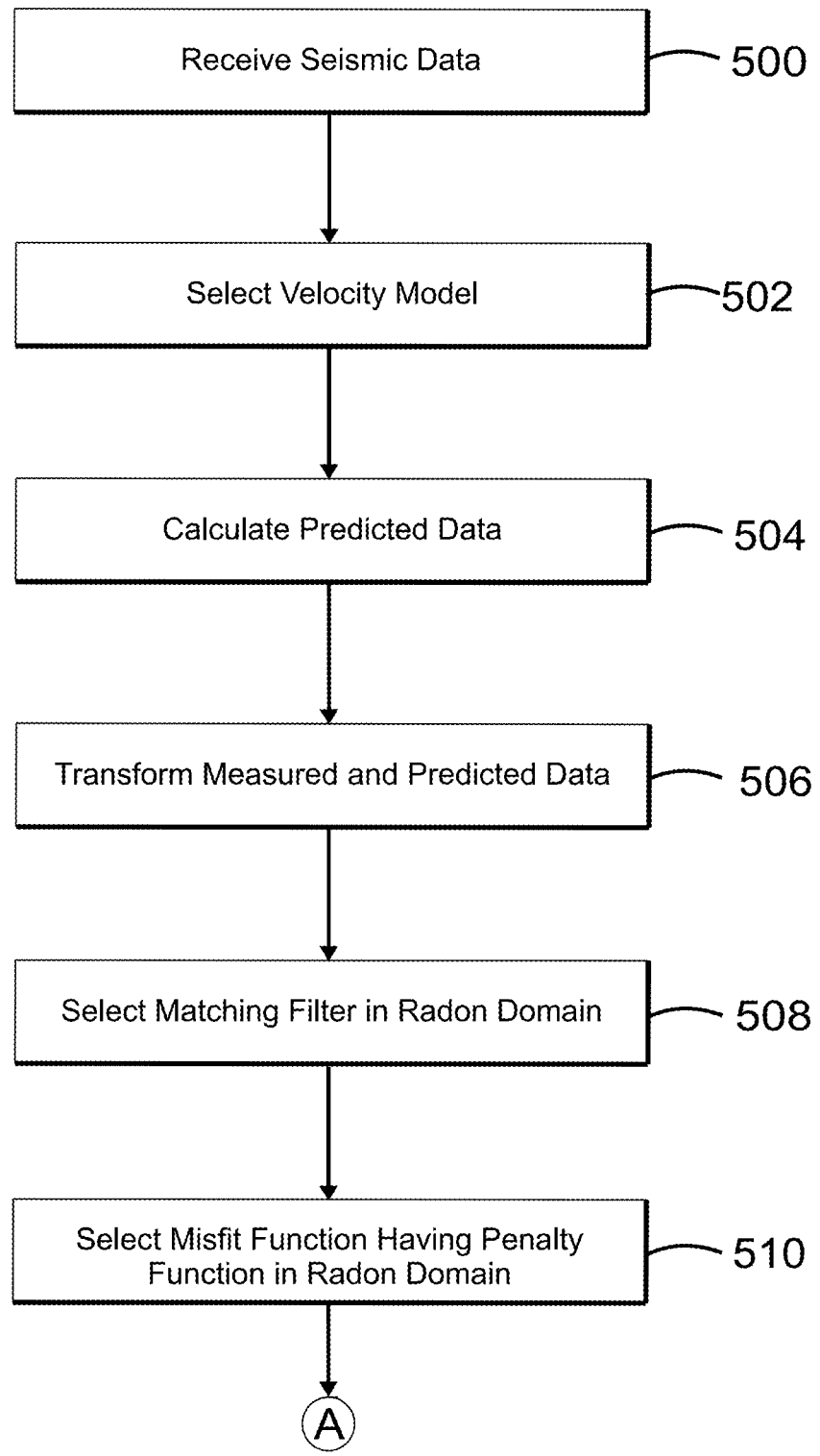
FIGS. 5A and 5B illustrate a flowchart of a method for calculating a new velocity model using a misfit function that penalizes a matching filter in a tau-p domain.
Figure 5B:
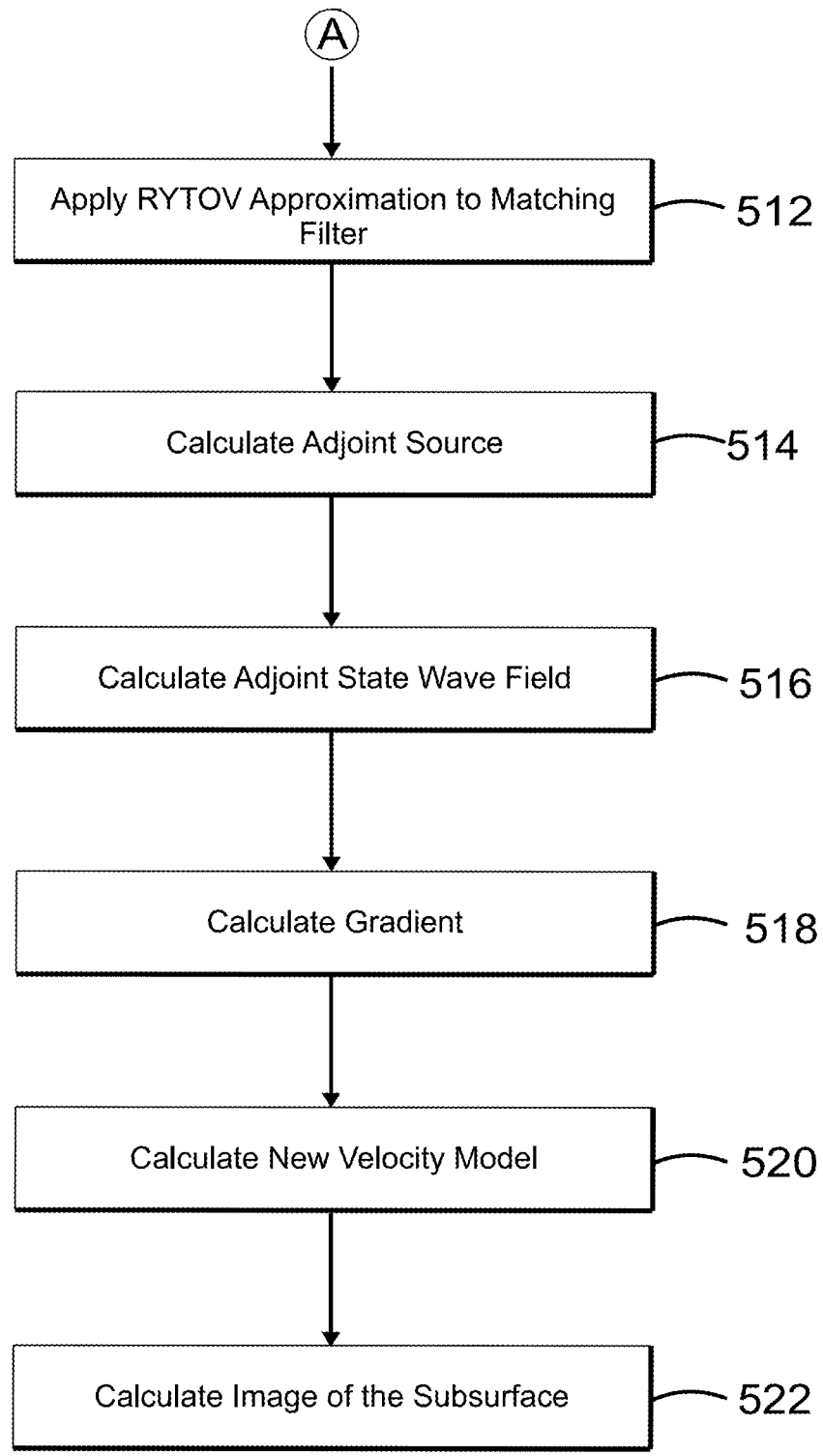

In other words, according to this embodiment, which is illustrated in FIGS. 5A and 5B, the FWI process includes a step 500 in which a set of measured seismic data d is received. The set can be land data, marine data, log data, etc. In step 502, a starting velocity model v is selected. This initial or starting model may be determined from other seismic data, log data, or may simply be a guess. Using the starting velocity model v, the predicted data p is calculated in step 504 using a wave equation operator L (as in equation (1)) and the initial velocity model v. In step 506, both the measured seismic data d and the predicted seismic data p are transformed from the time-space domain to the tau-p domain using a Radon transform. A matching filter w is selected in step 508 directly in the Radon transform, and a misfit function J is selected in step 510, also in the Radon transform. The misfit function J is based on the matching filter w and on a penalty function P. As previously discussed, the penalty function penalizes the matching filter when the matching filter deviates from a Delta Dirac function due to a mismatch between the measured seismic data and the predicted seismic data. In step 512, a Rytov approximation is applied to the matching filter w in the Radon domain. In step 514, the adjoint source is expressed based on the misfit function (see equations (29) and (30)), in step 516 the adjoint state wavefield $u_R$ is calculated, for example, based on equation (1), and in step 518 a gradient of the wave field velocity operator L with regard to the model parameter m is calculated, for example. Note that all these steps are calculated in the Radon transform. Based on the calculated gradient g, a global minimum or maximum of the misfit function J is calculated, which produces in step 520 the new velocity model $v_{new}$. This process may be repeated a few times, if necessary, until a predetermined condition is met, for example, misfit function values is below a given threshold, or the calculations are repeated a predetermined number of times. In step 522, based on the new velocity model, an image of the subsurface may be calculated.

According to yet another embodiment, a new misfit function is now discussed. The new misfit function may be obtained by applying the optimal transport theory to the matching filter. A review of the conventional optimal transport theory is believed to be order for a better understanding of the new misfit function.

Suppose that there are two sets of data, the observed (or measured) set of data $d(t, x_r, x_s)$, which is collected with receivers as shown in FIG. 1, and a predicted set of data $p(t, x_r, x_s)$, which is calculated as discussed above, for example, with regard to equation (1). The optimal transport theory indicates that a Wasserstein distance can be used to define a misfit function as follows:

$$j = \min_T \int |t - T(t)|^2 p(t) dt, \quad (31)$$

where T is the transport plan, which maps the mass of p into the mass of d, where p and d are considered to be distributions. Note that the optimal transport theory finds the map T for two given densities of mass d and p, with an integral of p equal to an integral of d equal to 1. For simplicity, the $x_r$ and $x_s$ coordinates of the receivers and sources are omitted herein. For a 1D problem, an explicit formula exists for the Wasserstein distance, i.e., $$J = \int |t - D^{-1}(P(t))|^2 p(t) dt, \quad (32)$$

where $D^{-1}$ is the inverse function of D, and D and P are the cumulative distribution functions given by:

$$D(t) = \int_0^t d(t') dt', \quad (33)$$

$$P(t) = \int_0^t p(t') dt', \quad (34)$$

with t' being an integration variable.

The optimal transport theory requires the functions d and p to be distributions, i.e., $d(t) \geq 0$, $p(t) \geq 0$ and $\int d(t) dt = \int p(t) dt = 1$. However, the seismic data d or p are oscillatory in nature and they have a zero mean. Thus, the seismic data d and p do not fulfil the requirements of a distribution. To fix this problem, it is possible to precondition the seismic data to fulfill this requirement. The preconditioning may involve adding a large value to each trace to make the entire trace non-negative, followed up by a normalization to make the summation (or integration) of the traces equal to 1.

However, the conventional optimal transport theory that uses the preconditioning step noted above modifies not only the amplitude but also the phase of the predicted and measured seismic data and this makes the inversion process unstable and inaccurate, which is not desired for a robust FWI process.

Thus, according to this embodiment, a Wasserstein distance is applied between the matching filter and the Dirac Delta function, instead of being applied to the p and d seismic data. Similar to equation (3), the observed data $d(t)$ and the computed data $p(t)$ can be matched to each other with a matching filter $w(t)$ as follows:

$$d(t) * w(t) = p(t). \quad (35)$$

To fulfill the requirement of the optimal transport theory discussed above, the matching filter w is preconditioned and modified to be a distribution. Note that this approach does not precondition the observed and predicted seismic data. In this embodiment, the matching filter is squared and normalized as follows:

$$w'(t) = \frac{w^2(t)}{\int w^2(t) dt} = \frac{w^2}{\|w\|_2^2}. \quad (36)$$

However, one skilled in the art would understand that there are other ways to condition the matching filter to fulfill the requirements of the optimal transport theory. When the model parameters are accurate, the resulting matching filter reduces to a "Dirac Delta function," i.e., the target of this approach is to have the matching filter be $\delta(t)$. Using the theory of optimal transport, the misfit function J given by equation (32) becomes:

$$J(w', \delta(t)) = \int |t - \Delta^{-1}(W'(t))|^2 w'(t) dt \quad (37)$$

$$= \frac{\int |t - \Delta^{-1}(W'(t))|^2 w^2(t) dt}{\|w\|_2^2},$$

where the Laplace operator $\Delta$ and W'(t) are used to indicate the commutative distribution function for the Dirac Delta function $\delta^2(t)$ and the normalized matching filter w'(t), respectively. Thus, $\Delta^{-1}$ is the inverse function for the commutative distribution function $\Delta$. It is also possible to use the 2D or 3D optimal transport theory over more dimensions.

Figure 6:
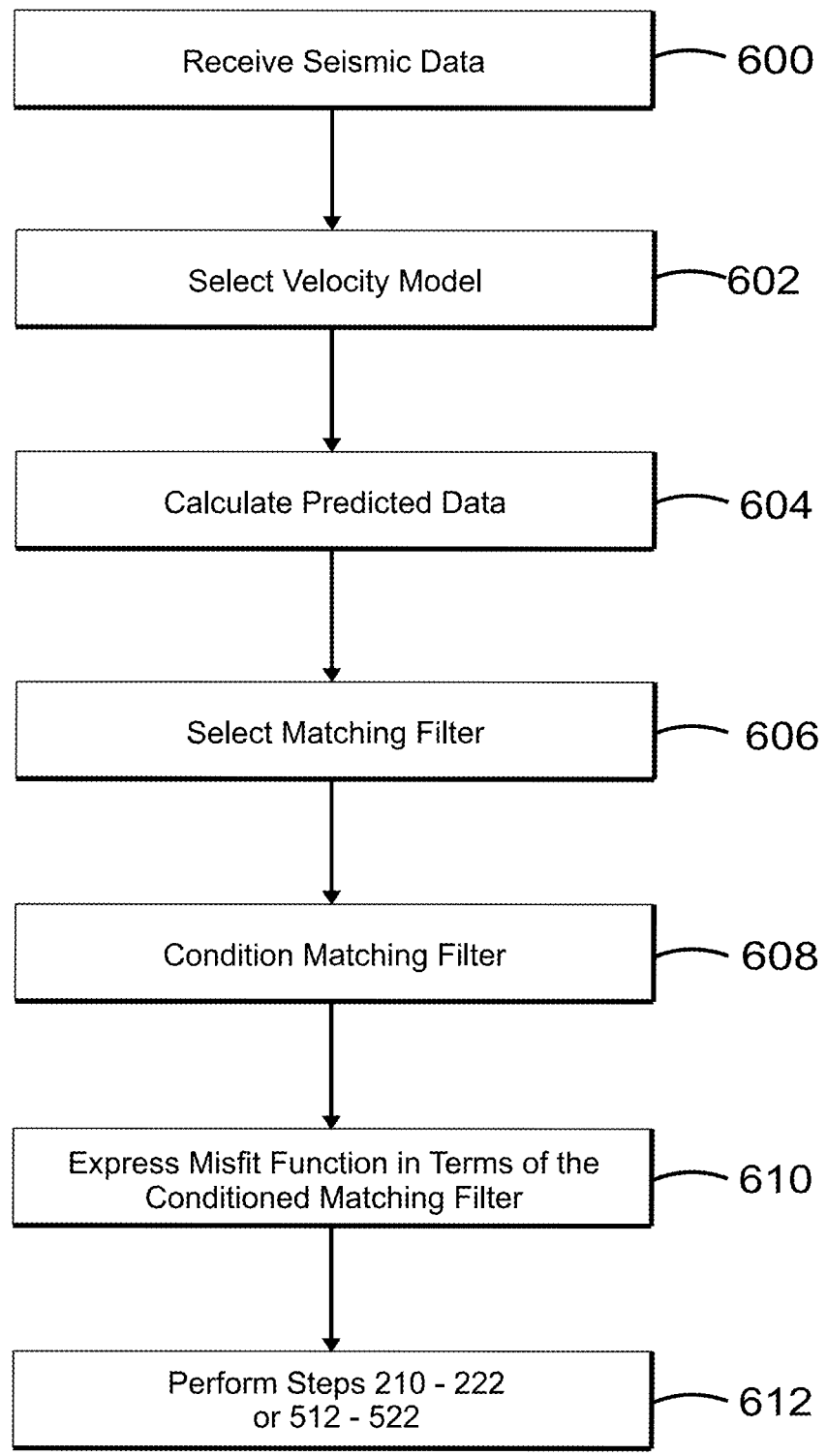
FIG. 6 is a flowchart of a method for conditioning a matching filter that is used in a misfit function during a full waveform inversion process.

A method for applying this new misfit function J is now discussed with regard to FIG. 6. In step 600, the measured seismic data d is received. In step 602, a velocity model is selected and in step 604, the predicted seismic data p is calculated using, for example, the wave equation operator L. In step 606, a matching filter w is selected to match the measured data d to the predicted data p. The matching filter is conditioned in step 608 to fulfill the optimal transport process, i.e., the matching filter should be a distribution having all values equal to or larger than zero and a time integral of the entire distribution should be equal to 1. Thus, in step 608, the matching filter w is squared and normalized based on equation (36). In step 610, the misfit function is expressed in terms of the conditioned matching filter and from here, in step 612, the steps 210 to 222 of the method illustrated in FIGS. 2A and 2B are performed with the matching filter shown in equation (36) and the misfit function shown in equation (37). Alternatively, step 612 may include the steps 512 to 522 of the method shown in FIGS. 5A and 5B. These steps are performed for generating a new velocity model and an image of the subsurface.

The various embodiments discussed above have their advantages over the known art. For example, with regard to the embodiment illustrated in FIGS. 5A and 5B, a Radon transform was used to transform the seismic dataset from the time-space domain to the tau-p domain and a matching filter was computed in the tau-p domain for the observed and predicted data, so that the matching filter was indexed by the same p value. As the cross-talk events are easier separated in the tau-p domain, the computation of the matching filter in tau-p domain is more robust, and thus, leads to a more stable and accurate FWI inversion.

In this regard, note that the Radon transform described in this application is a linear version, which in geophysics is called slant stack or tau-p transform. However, other forms of the Radon transform may used in the above embodiments, like the hyperbolic and/or parabolic Radon transform.

A high-resolution sparse Random transform (Trad et al., 2002) can be adopted and it will improve the resolution of the tau-p domain dataset. It will be beneficial to use a high-resolution sparse Random transform for a high resolution FWI process aiming at inverting the subsurface with more details.

In one application, the Radon transform can be implemented in the time or the frequency domain. Muting and filtering the seismic data can be simultaneously applied during the Radon transform process and this would further improve the signal-to-noise ratio (SNR) of the resulting computed matching filter and consequently improve the FWI inversion result.

In one application, the Radon transform was applied to a common shot gather during the inversion. However, the same methodology can work on common receiver gathers, common middle point gathers, common azimuth gathers, etc. This is due to the fact that in those reasonably grouped gathers, the seismic event would always show coherent features and depends on the different type of seismic acquisitions, some of them would be better than others in terms of SNR.

Although the previous embodiments focus on improving the methodology of FWI using a matching filter, one skilled in the art would understand that these embodiments have wider applications. The Radon transform can be implemented to other misfit functions: e.g., the normalized global cross-correlation, the optimal transport misfit function. In general, a misfit function tries to compare two traces from the predicted and observed data. The Radon transform would at first transform the dataset into the tau-p domain, and then will design a misfit function. In other words, the conventional misfit function is designed to compare the traces that reside in the physical t-x space, where the original signals were recorded. One or more of the embodiments discussed above use the Radon transform to transform the data into the tau-p domain, where the signals are well separated and this leads to a more robust misfit function design for the FWI process.

According to still another embodiment, it is possible to formulate the misfit function as a least square error of the travel time shift (associated with the measured seismic data) computed by a cross-correlation analysis of a penalty function with the matching filter. This approach extends the misfit function to a more generalized form in terms of moments of the resulting matching filter distribution. Specifically, the misfit function of this embodiment can be considered as a (squared) first order moment of the matching filter. The previous embodiments can be considered as a special case of the second-order moment, i.e., the variance. Higher order moments such as skewness (third order) or kurtosis (fourth order) can also be used as the misfit function. Hybrid misfit functions by combination of different order of moment shows a lot of potential. Thus, in this embodiment, a robust misfit function by least square inversion of the cross-correlation travel time shift errors is discussed. This new misfit function is formulated using the least square error of the travel time shift for each trace, which is given by:

$$J = \sum_{x_s} \sum_{x_r} \frac{1}{2} \Delta \tau^2(x_s, x_r), \tag{39}$$

where $x_s$ and $x_r$ are the sources and receiver positions for the trace, and $\Delta \tau(x_s, x_r)$ are the travel time shift computed for each trace. To simplify the derivation of the misfit function J, in the following, the summations over sources and receivers are omitted. Thus, equation (39) becomes:

$$J = \frac{1}{2} \Delta \tau^2, \tag{40}$$

To compute the travel time shift $\Delta \tau$, first a matching filter w(t) is computed. The matching filter matches the measured data d(t) with the predicted data p(t) as follows:

$$d(t) * w(t) = p(t), \tag{41}$$

where * denotes the convolution operation. Equation (41) is a linear equation, and the matching filter w(t) can be computed either in the time domain or in the frequency domain, as follows:

$$w(t) = \mathcal{F}^{-} \left[ \frac{\mathcal{F}[p(t)] \overline{\mathcal{F}[d(t)]}}{\mathcal{F}[d(t)] \overline{\mathcal{F}[d(t)]} + \epsilon} \right], \tag{42}$$

where $\mathcal{F}$ and $\mathcal{F}^{-}$ denote the Fourier transform and its inverse, respectively, the overline sign indicates the complex conjugate operation, and e is a small positive number to avoid dividing over zero.

If the velocity model for generating the predicted data p(t) is correct, the resulting matching filter would be a Dirac Delta function. Otherwise, its non-zero coefficients would spread over non-zero lags. A cross-correlation function $f(\tau)$ is introduced to measure such defocusing of the matching filter, and is given by:

$$f(\tau) = \frac{1}{2} \int (t+\tau)^2 w^2(t) dt, \tag{43}$$

where the time shift $\Delta \tau$ defined in equation (40) corresponds to the minimum value of $f(\tau)$. If the velocity model is accurate, the matching filter w(t) would be a Dirac Delta function, and the minimum value would correspond to the time shift $\Delta \tau = 0$. If the velocity model is not accurate, the time shift $\Delta \tau$ is non-zero and by minimizing its square errors, it is possible to update the velocity model.

As the travel time shift $\Delta \tau$ corresponds to the minimum value of $f(\tau)$, its first order derivative at the corresponding travel time shift would be zero, and thus, the following connective function is obtained:

$$\frac{df(\tau)}{d\tau}(\text{when } \tau = \Delta \tau) = \int (t + \Delta \tau) w^2(t) dt = 0. \tag{44}$$

Using equation (44), the travel time shift $\Delta \tau$ can be expressed as:

$$\Delta \tau = -\frac{\int t w^2(t) dt}{\int w(t)^2 dt} = -\frac{\int t w^2(t) dt}{\|w\|_2^2}. \tag{45}$$

Substituting equation (45) in equation (40), the final formula for the proposed misfit function J is obtained as:

$$J = \frac{1}{2} \left[ \frac{\int t w^2(t) dt}{\|w\|_2^2} \right]^2. \tag{46}$$

To update the velocity model, it is necessary to compute the adjoint source, which is the derivative of the misfit function with respect to the predicted data, which is given by:

$$\delta s = \frac{\partial J}{\partial p} = \frac{\partial w}{\partial p} \frac{\partial J}{\partial w}, \tag{47}$$

where $$\frac{\partial J}{\partial w}$$

is the derivative of the misfit function of equation (46) with respect to the matching filter w(t), which can be expressed as:

$$\frac{\partial J}{\partial w} = -\frac{2(t\Delta\tau + \Delta\tau^2)w(t)}{\|w\|_2^2}. \tag{48}$$

The term $$\frac{\partial w}{\partial p}$$

in equation (47) is the derivative of the matching filter with respect to the predicated data, and it can be computed by the adjoint analysis of equation (43) as follows:

$$\frac{\partial w}{\partial p} = \mathcal{F}^- \text{diag}\left[\frac{\mathcal{F}[d(t)]}{\mathcal{F}[d(t)]\overline{\mathcal{F}[d(t)]} + \epsilon}\right]\mathcal{F}. \tag{49}$$

As long as the adjoint of the source is calculated, the next steps for this embodiment are similar to those of the previous embodiments, and thus, they are not repeated herein. It is possible to back propagate the adjoint source, compute the gradient, apply a linear search, and update the model.

According to an embodiment, the misfit function J of equation (46) can be extended to the following general form:

$$J_n = \mu_n^{mod(2,n)==0?1:2} = [\int t^n w'(t) dt]^{mod(2,n)==0?1:2}, \tag{50}$$

where mod(2, n)==0?1:2 indicates that if n is odd, the result should be 1, or otherwise the result is 2. The function w'(t) is a distribution computed by a precondition of the matching filter w(t). The term $\mu_n$ is the n-th order moment of distribution, which is given by:

$$\mu_n = \int t^n w'(t) dt. \tag{51}$$

Using equation (50), the proposed misfit function J of equation (46) is nothing else than the square of the first order moment (the mean) corresponding to n=1 with the precondition defined by:

$$w'(t) = \frac{w(t)}{\|w\|_2^2}. \tag{52}$$

In one application, another precondition may be selected, which may effect the performance of the resulting misfit function.

Different misfit functions may be constructed by using different n values. For example, the misfit function of the adaptive waveform inversion (see Warner and Guasch, 2016) can be considered with a penalty term selected to be $t^2$, and this corresponds to the generalized misfit function of equation (50) with n=2, as follows:

$$J_2 = \frac{\int t^2 w(t)^2 dt}{\|w\|_2^2}. \tag{53}$$

Thus, the corresponding $\mu_2$ for the AWI is the second order moment, i.e., the variance of the matching filter distribution. Higher order moments such as the skewness (n=3) or the kurtosis (n=4) may also be useful for a robust misfit function.

In one application, it is possible to use a hybrid misfit function, which is defined by combining more than one of the moments in the misfit function, e.g., $$J_{1,2} = \mu_1^2 + \lambda\mu_2, \tag{54}$$

where λ is a weighting factor.

Figure 7:
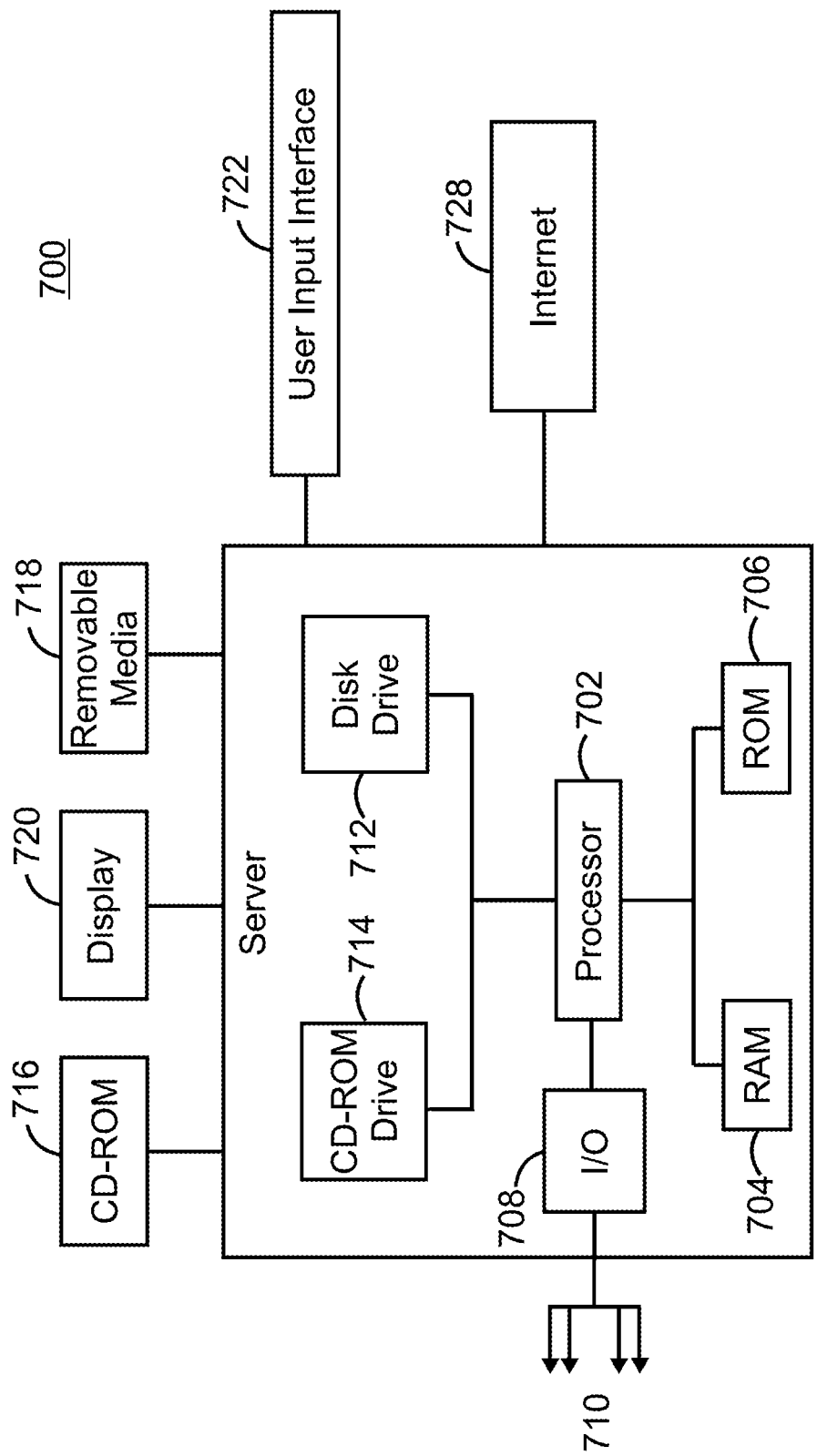
FIG. 7 illustrates a computing unit in which one or more of the methods discussed above can be implemented.

The above-discussed procedures and methods may be implemented in a computing device as illustrated in FIG. 7. Hardware, firmware, software or a combination thereof may be used to perform the various steps and operations described herein. Computing device 700 of FIG. 7 is an exemplary computing structure that may be used in connection with such a system.

Exemplary computing device 700 suitable for performing the activities described in the above embodiments may include a server 701. Such a server 701 may include a central processor (CPU) 702 coupled to a random access memory (RAM) 704 and to a read-only memory (ROM) 706. ROM 706 may also be other types of storage media to store programs, such as programmable ROM (PROM), erasable PROM (EPROM), etc. Processor 702 may communicate with other internal and external components through input/output (I/O) circuitry 708 and bussing 710 to provide control signals and the like. Processor 702 carries out a variety of functions as are known in the art, as dictated by software and/or firmware instructions.

Server 701 may also include one or more data storage devices, including hard drives 712, CD-ROM drives 714 and other hardware capable of reading and/or storing information, such as DVD, etc. In one embodiment, software for carrying out the above-discussed steps may be stored and distributed on a CD-ROM or DVD 716, a USB storage device 718 or other form of media capable of portably storing information. These storage media may be inserted into, and read by, devices such as CD-ROM drive 714, disk drive 712, etc. Server 701 may be coupled to a display 720, which may be any type of known display or presentation screen, such as LCD, plasma display, cathode ray tube (CRT), etc. A user input interface 722 is provided, including one or more user interface mechanisms such as a mouse, keyboard, microphone, touchpad, touch screen, voice-recognition system, etc.

Server 701 may be coupled to other devices, such as sources, detectors, etc. The server may be part of a larger network configuration as in a global area network (GAN) such as the Internet 728, which allows ultimate connection to various landline and/or mobile computing devices.

The disclosed embodiments provide methods and devices that generate a misfit function based on a matching filter and the misfit function introduces a penalty for the matching filter and not for the seismic data. It should be understood that this description is not intended to limit the invention. On the contrary, the embodiments are intended to cover alternatives, modifications and equivalents, which are included in the spirit and scope of the invention as defined by the appended claims. Further, in the detailed description of the embodiments, numerous specific details are set forth in order to provide a comprehensive understanding of the claimed invention. However, one skilled in the art would understand that various embodiments may be practiced without such specific details.

Although the features and elements of the present embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

REFERENCES

Debens, H. A., F. Mancini, M. Warner, and L. Guasch, 2017, Full-bandwidth adaptive waveform inversion at the reservoir: SEG Technical Program Expanded Abstracts 2017, 1378-1382.

Huang, G., R. Nammour, and W. Symes, 2017, Full-waveform inversion via source-receiver extension: Geophysics, 82, R153-R171.

Luo, S., and P. Sava, 2011, A deconvolution based objective function for wave equation inversion: SEG Technical Program Expanded Abstracts 2011, 2788-2792.

Metivier, L., R. Brossier, Q. Merigot, E. Oudet, and J. Virieux, 2016, Measuring the misfit between seismograms using an optimal transport distance: application to full waveform inversion: Geophysical Journal International, 205, 345-377.

What is claimed is:

1. A method for calculating a velocity model for a subsurface of the earth, the method comprising:
receiving measured seismic data d;
calculating predicted seismic data p;
selecting a matching filter w such that a convolution operation between the matching filter w and one of the measured seismic data d or the predicted seismic data p is equal to the other one of the measured seismic data d or the predicted seismic data p;
selecting a misfit function J that calculates (1) a distance between the matching filter w and a Dirac Delta function or (2) a travel time shift associated with the measured seismic data;
calculating a new velocity model using the misfit function J, the measured seismic data d, and the predicted seismic data p; and
generating an image of the subsurface of the earth, based on the new velocity model, for identifying resources in the subsurface,
wherein the measured seismic data d includes wavefields generated by a seismic source and the wavefields propagate through the subsurface where they are attenuated and reflected, and the attenuated and reflected wavefields are recorded by plural seismic receivers.

2. The method of claim 1, wherein the step of selecting the misfit function J comprises:
defining the misfit function J as a product of the matching filter w and a penalty function P that varies with a time t.

3. The method of claim 2, wherein the penalty function P is equal to an absolute value of time t.

4. The method of claim 2, further comprising:
applying a Rytov approximation to the matching filter w.

5. The method of claim 4, wherein the Rytov approximation rewrites the matching filter w as a sum of shifted weighted Dirac Delta functions.

6. The method of claim 5, further comprising:
calculating an adjoint source s, which is associated with a mismatch between the measured seismic data d and the predicted seismic data p, using the misfit function J.

7. The method of claim 6, further comprising:
calculating an adjoint state wavefield $u_P$ using the adjoint source s and a wave equation operator L; and
calculating a gradient g of the wave equation operator L.

8. The method of claim 7, further comprising:
calculating the new velocity model using the gradient g.

9. The method of claim 1, further comprising:
conditioning the matching filter w to be a distribution whose integral over time is unity and each value of the distribution is equal to or larger than zero.

10. A computing unit for calculating a velocity model for a subsurface of the earth, the computing unit comprising:
an interface for receiving measured seismic data d; and
a processor connected to the interface and configured to:
calculate predicted seismic data p;
select a matching filter w such that a convolution operation between the matching filter w and the measured seismic data is equal to the predicted seismic data p;
select a misfit function J that that is indicative of (1) a distance between the matching filter w and a Dirac Delta function or (2) a travel time shift associated with the measured seismic data;
calculate a new velocity model using the misfit function J, the measured seismic data d, and the predicted seismic data p; and
generating an image of the subsurface of the earth, based on the new velocity model, for identifying resources in the subsurface,
wherein the measured seismic data d includes wavefields generated by a seismic source and the wavefields propagate through the subsurface where they are attenuated and reflected, and the attenuated and reflected wavefields are recorded by plural seismic receivers.

11. The computing unit of claim 10, wherein the processor is further configured to:
calculate the misfit function J as a product of the matching filter w and a penalty function P that varies with a time t.

* * * * *